United States Patent
Chen

(10) Patent No.: US 10,778,137 B1
(45) Date of Patent: Sep. 15, 2020

(54) DRIVE DEVICE CAPABLE OF RECORDING WORKING STATUS

(71) Applicant: MARK STAR Servo-tech Co., Ltd., Yilan, Yilan County (TW)

(72) Inventor: Chih-Feng Chen, Yilan (TW)

(73) Assignee: MARK STAR SERVO-TECH CO., LTD., Yilan, Yilan County (TW)

( * ) Notice: Subject to any disclaimer, the term of this patent is extended or adjusted under 35 U.S.C. 154(b) by 0 days.

(21) Appl. No.: 16/440,959

(22) Filed: Jun. 13, 2019

(51) Int. Cl.
*H02P 29/60* (2016.01)
*H02P 29/024* (2016.01)
*G05B 19/23* (2006.01)
*G05B 19/4062* (2006.01)
*H02P 29/028* (2016.01)

(52) U.S. Cl.
CPC ............ *H02P 29/60* (2016.02); *G05B 19/237* (2013.01); *G05B 19/4062* (2013.01); *H02P 29/025* (2013.01); *H02P 29/027* (2013.01); *H02P 29/0241* (2016.02); *G05B 2219/1185* (2013.01); *H02P 29/028* (2013.01)

(58) Field of Classification Search
CPC ............................... H02P 29/60; H02P 29/025
USPC .......................................................... 318/560
See application file for complete search history.

(56) References Cited

U.S. PATENT DOCUMENTS

| | | | | | |
|---|---|---|---|---|---|
| 4,625,218 | A | * | 11/1986 | Watanabe | G01D 15/24 346/106 |
| 5,107,484 | A | * | 4/1992 | Kawamura | G11B 11/10558 360/99.06 |
| 5,220,548 | A | * | 6/1993 | Nakatsukasa | G11B 17/225 369/30.45 |

\* cited by examiner

*Primary Examiner* — Bentsu Ro
(74) *Attorney, Agent, or Firm* — Leong C. Lei

(57) ABSTRACT

A drive device capable of recording a working status includes: a drive mechanism, including a housing, an actuating unit configured inside the housing and a transmission unit configured inside the housing and in connection with the actuating unit; a sensing unit, configured inside the housing and in electric connection with the actuating unit; and a storage unit, configured inside the housing and in electric connection with the sensing unit. Whereby, the drive device can be installed inside a unmanned control or automatic machine, utilizes the sensing unit to sense a working status of the drive mechanism, and records working status data in the storage unit; the working status stored in the storage unit can be read after the machine fails or is damaged, the working status of the drive mechanism of the damaged machine, and the cause of the failure occurrence is clarified, as a basis for subsequent performance improvement.

7 Claims, 3 Drawing Sheets

DRIVE DEVICE CAPABLE OF RECORDING WORKING STATUS

(a) TECHNICAL FIELD OF THE INVENTION

The present invention relates to a drive device capable of recording a working status, and more particularly to a drive device capable of recording a working status, which can check back the working status of a drive mechanism when a machine is damaged and clarify the cause of the failure occurrence as a basis for subsequent performance improvement

(b) DESCRIPTION OF THE PRIOR ART

Conventional drive devices with a status feedback function such as unmanned control or automatic machines usually feedback working status data to remote control hosts for recording. Therefore, the working status data of the drive devices will be recorded in the remote-control hosts through the connection the drive devices with the remote-control hosts, and the drive devices themselves cannot do the recording. However, not all users use the remote-control hosts to do the recording; once it is impossible to recall the status of the current drive unit in the event of a failure, there will be no basis for the occurrence of the failure In addition, it is possible to fail to maintain connection between the remote control host and drive device because of disconnection, power problems, signal interference and other conditions, causing the remote-control host not to be in connection with the drive device such that the drive device is unable to be acted according to the commands released by the remote-control host. At this time, the remote-control host will not receive the feedback data from the drive device, causing the actual failure condition to be difficult to be judged.

SUMMARY OF THE INVENTION

The main object of the present invention is to provide a drive device capable of recording a working status, capable of being installed inside a unmanned control or automatic machine, and utilizing a sensing unit to sense a working status of the drive mechanism, and recording working status data in a storage unit; the working status stored in the storage unit can be read after the machine fails or is damaged, the working status of the drive mechanism at the time when the machine is damaged, and the cause of the failure occurrence is clarified, as a basis for subsequent performance improvement.

To achieve the object mentioned above, the present invention proposes a drive device capable of recording a working status, including: a drive mechanism, including a housing, an actuating unit configured inside the housing and a transmission unit configured inside the housing and in connection with the actuating unit; a sensing unit, configured inside the housing and in electric connection with the actuating unit; and a storage unit, configured inside the housing and in electric connection with the sensing unit.

In a preferred embodiment of the drive device mentioned above, the actuating unit is a motor.

In a preferred embodiment of the drive device mentioned above, the transmission unit is a gear train.

In a preferred embodiment of the drive device mentioned above, the sensing unit at least comprises a temperature sensor, angle sensor, voltage sensor, current sensor, control signal sensor, acceleration sensor and angular speed sensor.

In a preferred embodiment of the drive device mentioned above, the sensing unit is in electric connection with the actuating unit with a conducting line.

In a preferred embodiment of the drive device mentioned above, the storage unit is a memory.

In a preferred embodiment of the drive device mentioned above, the storage unit comprises a memory card connector and a memory card movably plugged in the memory card connector.

DETAILED DESCRIPTION OF THE PREFERRED EMBODIMENTS

Figure 1:
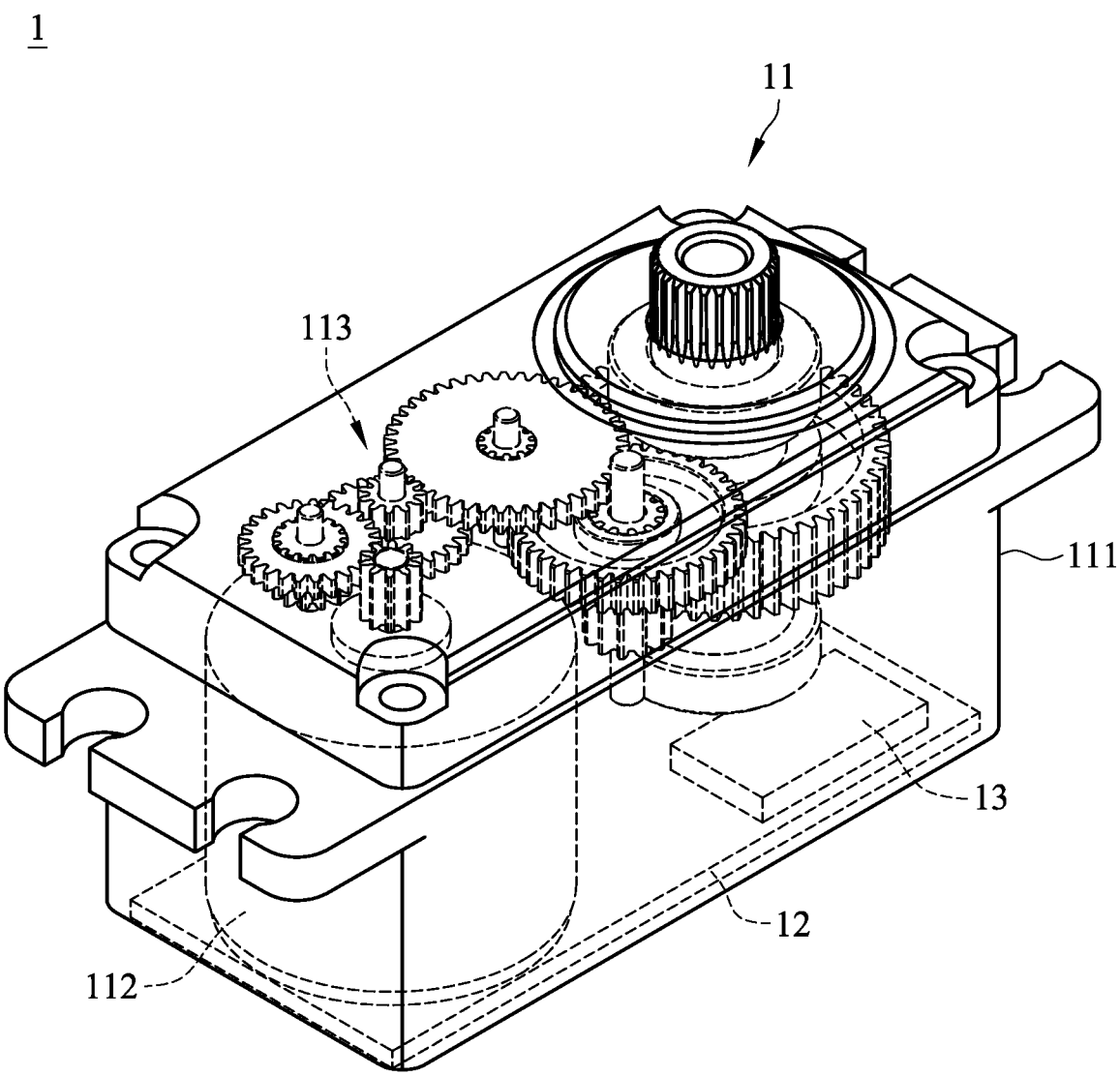
FIG. 1 is a perspective view of the present invention.
Figure 2:
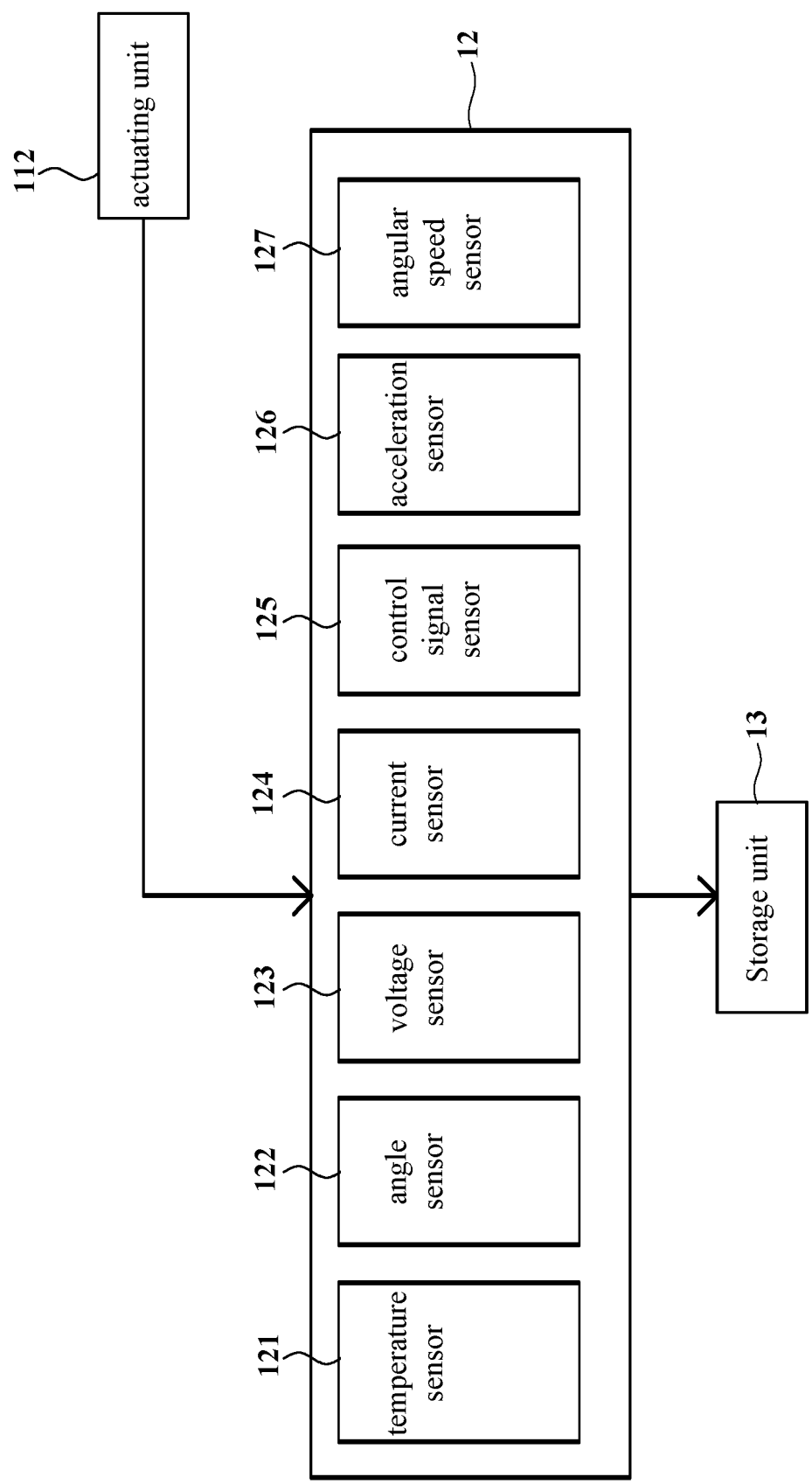
FIG. 2 is a block diagram of the present invention.

Referring to FIGS. 1 and 2, a drive device 1 capable of recording a working status of the present invention is at least constituted by a drive mechanism 11, sensing unit 12 and storage unit 13.

The drive mechanism 11 includes a housing 111, actuating unit 112 configured inside the housing 111 and transmission unit 113 configured inside the housing 111 and in connection with the actuating unit 112, where the actuating unit 112 is a motor, and the transmission unit 113 is a gear train.

The sensing unit 12 is configured inside the housing 111 and in electric connection with the actuating unit 112.

The storage unit 13 is configured inside the housing 111 and in electric connection with the sensing unit 12.

Accordingly, upon the application of the present invention, the drive device 1 can be installed inside every type of unmanned control or automatic machine (not shown in the figures), and the actuating unit 112 and transmission unit 113 of the drive mechanism 11 are operated in coordination with each other to perform the required operations within the machine; when the drive mechanism 11 is started to operate, the sensing unit 12 can be used to sense a working status (e.g. temperature, angular position, voltage, current control command signal, accelerator and rotation and tilt angle, etc.) of the drive mechanism 11, and the working status data is recorded in the storage unit 13; thus, the working status data can be read form the storage unit 13 after the machine fails or is damaged, the working status of the drive mechanism 11 at the time when the machine is damaged is checked, and the cause of the failure occurrence is clarified as a basis for subsequent performance improvement.

In a preferred embodiment, the sensing unit 12 at least includes a temperature sensor 121, angle sensor 122, voltage sensor 123, current sensor 124, control signal sensor 125, acceleration sensor 126 and angular speed sensor 127. Whereby, the temperature sensor 121 senses the temperature of the drive mechanism 11, the angle sensor 122 the angular position thereof, the voltage sensor 123 the voltage thereof, the current sensor 124 the current thereof, the control signal sensor 125 the control command signals received by the drive mechanism 11, the acceleration sensor 126 senses the accelerator triaxial position of the drive mechanism 11 and measures and records whether the drive device 1 has a major displacement or has been hit, the angular speed sensor 127 (e.g. gyroscope) senses the rotation and tilt angle of the drive mechanism 11, and the sensing unit 12 records every type of working status of the drive device 1 and stores it in the storage unit 13. Therefore, the working status data stored in the storage unit 13 can be read even after the machine fails or is damaged, the working status of the drive mechanism 11 at the time when the machine is damaged is checked, and the cause of failure occurrence is clarified, as a basis for subsequent performance improvement.

Figure 3:
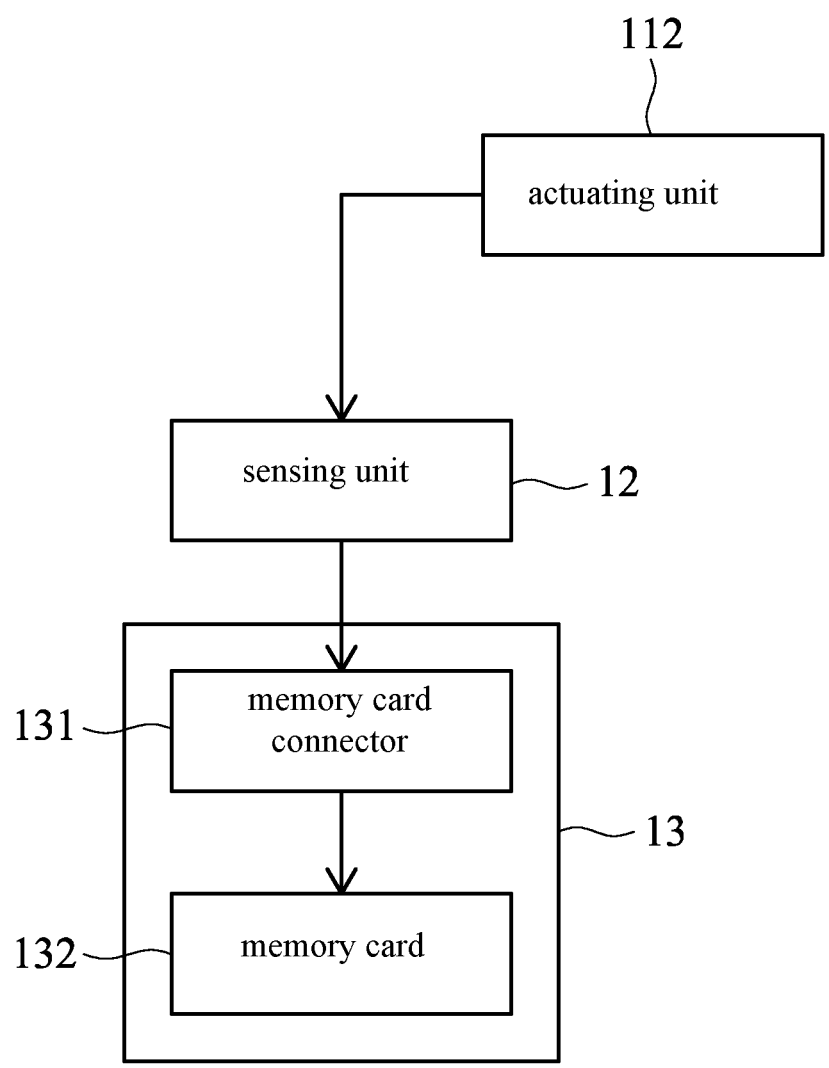
FIG. 3 is a block diagram of another preferred embodiment of the present invention.

Referring to FIG. 3, the storage unit 13, in another preferred embodiment, includes a memory card connector 131 and a memory card 132 movably plugged in the memory card connector 131. In addition, the storage unit 13 may also be a memory. Therefore, the storage unit 13 can be allowed to record the working status data in a form of the external memory card 132 or inbuilt memory according to use requirements; the working status data in the memory card can be taken out and read, or the working status data in the memory is read through the machine with a transmission line after the machine fails or is damaged in order to make the present invention more suitable for practical use.

Conclusively, the drive device capable of recording a working status of the present invention can effectively overcome the disadvantages of conventional drive devices. The present invention can install the drive device inside a unmanned control or automatic machine, uses the sensing unit to sense the working statuses of the drive mechanism, and records the working status data in the storage unit. The working status data in the storage unit can be read after the machine fails or is damaged, the cause of failure occurrence can be clarified as a basis for subsequent performance improvement.

I claim:

1. A drive device capable of recording a working status, comprising:
   a drive mechanism, comprising a housing, an actuating unit configured inside said housing and a transmission unit configured inside said housing and in connection with said actuating unit;
   a sensing unit, configured inside said housing and in electric connection with said actuating unit; and
   a storage unit, configured inside said housing and in electric connection with said sensing unit.

2. The drive device according to claim 1, wherein said actuating unit is a motor.

3. The drive device according to claim 1, wherein said transmission unit is a gear train.

4. The drive device according to claim 1, wherein said sensing unit at least comprises a temperature sensor, angle sensor, voltage sensor, current sensor, control signal sensor, acceleration sensor and angular speed sensor.

5. The drive device according to claim 1, wherein said sensing unit is in electric connection with said actuating unit with a conducting line.

6. The drive device according to claim 1, wherein said storage unit is a memory.

7. The drive device according to claim 1, wherein said storage unit comprises a memory card connector and a memory card movably plugged in said memory card connector.

* * * * *